United States Patent [19]

Nishina

[11] Patent Number: 4,689,890
[45] Date of Patent: Sep. 1, 1987

[54] DIGITAL DISPLAY MEASURING APPARATUS

[75] Inventor: Shingo Nishina, Kanagawa, Japan

[73] Assignee: Mitutoyo Mfg., Co., Ltd., Tokyo, Japan

[21] Appl. No.: 880,651

[22] Filed: Jun. 30, 1986

Related U.S. Application Data

[63] Continuation of Ser. No. 590,194, Mar. 15, 1984, abandoned.

[30] Foreign Application Priority Data

Mar. 18, 1983 [JP] Japan ................................. 58-46511

[51] Int. Cl.⁴ .......................... G01B 7/02; G02F 1/133
[52] U.S. Cl. .................................................... 33/504
[58] Field of Search ................ 33/172 E, 504, 125 R, 33/125 A, 125 C, 143 L, 166, 505

[56] References Cited

U.S. PATENT DOCUMENTS 3,895,356 7/1975 Kraus ............................ 33/172 E X
4,289,382 9/1981 Clark ............................ 33/172 E X Primary Examiner—William D. Martin, Jr.
Attorney, Agent, or Firm—Koda and Androlia

[57] ABSTRACT

A digital display measuring apparatus including a movable contact on the body of the measuring apparatus to engage with an object to be measured, an encoder for converting the displacement of the contact into an electrical output signal, a counting circuit for counting the output signal of the encoder, and a digital display for indicating the counted value from the counting circuit. The digital display further includes a measurement indicator unit for indicating the displacement of the contact and a preset indicator unit for indicating a preset value higher than those indicated in the measurement indicator unit. The preset indicator unit includes a presetting device for supplying a reference value to the preset input of the preset indicator unit. With this apparatus even if the object to be measured has a length exceeding the maximum displacement of the contact, the full length of the object may be measured and indicated.

3 Claims, 6 Drawing Figures

FIG.5(A)
FIG.5(B)
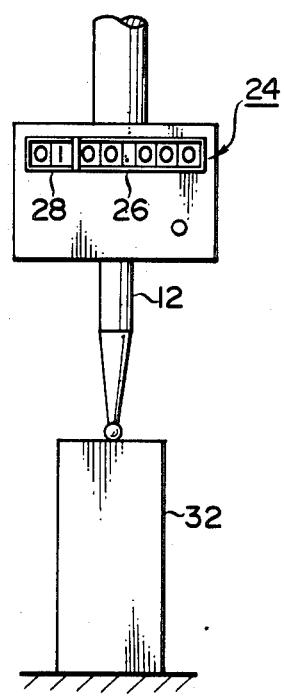
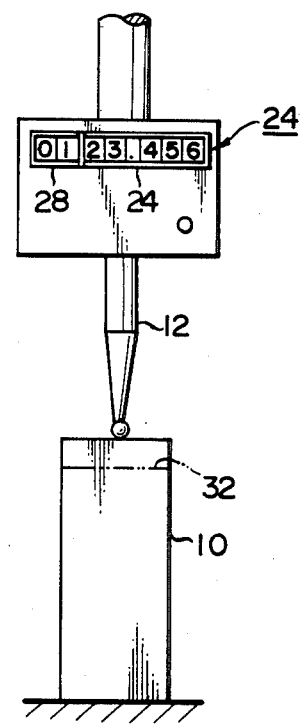

DIGITAL DISPLAY MEASURING APPARATUS

This is a continuation of application Ser. No. 590,194, filed Mar. 15, 1984, now abandoned.

BACKGROUND OF THE INVENTION

1. Field of the Invention

The present invention relates to a digital display measuring apparatus, and particularly to such an apparatus which digitally indicates the measured length of an object based on the displacement of a contact when engaging the object.

2. Description of the Prior Art

There are well known digital display measuring systems which digitally indicate the measured length of an object. Such systems are currently utilized in various fields of engineerings and others since they eliminate any personal error in measurement and more rapidly read measurements.

In the accompanying drawings, FIG. 1 shows the outline of a prior art digital display measuring system and FIG. 2 shows the circuit diagram thereof.

Referring to FIG. 1, there is shown the measuring system which is fixedly supported by a base (not shown) at a position above an object to be measured 10, the position being determined in accordance with the size of the object 10.

The measuring system comprises an axially movable contact 12 on the body thereof. The object 10 can be measured by detecting the displacement of the contact 12 from its home position to a position in which the contact 12 engages the object 10.

To detect the displacement of the contact 12, there is provided an encoder 14 which may be of any conventional type such as photoconductive type, electrostatic capacity type, variable resistance type or the like. The encoder 14 is adapted to convert the displacement of the contact 12 into an electrical sine-wave signal.

The electrical signal from the encoder 14 is converted into pulses through a waveform processing circuit (not shown). The pulses are then counted by a counter circuit 16 with the counted value being digitally indicated at an indicator section 20 on a digital display 18.

Thus, the indicator section 20 of the digital display 18 normally indicates a measurement corresponding to the displacement of the contact 12. Maximum measurement to be indicated will be restricted by the displacement of the contact 12. Therefore, the digital display 18 cannot indicate the measured length of an object which exceeds the maximum displacement of the contact 12.

SUMMARY OF THE INVENTION

In view of the above disadvantage of the prior art, it is therefore an object of the present invention to provide a digital display measuring apparatus which is simple in construction and provide a sufficient preset function in practice.

In order to accomplish the above object, the present invention provides a digital display measuring apparatus comprising a movable contact on the body of the measuring apparatus and adapted to engage an object to be measured, an encoder for converting the displacement of the contact into an electrical output signal, a counting circuit for counting the output signal from the encoder, and a digital display for indicating the counted value, said measuring apparatus being characterized by that said digital display has an indicating section which includes a measurement indicator unit for indicating the displacement of the contact and a preset indicator unit for indicating preset figures higher than those indicated by the measurement indicator unit, and that said preset indicator unit includes means for presetting a reference value therein.

BRIEF DESCRIPTION OF THE DRAWINGS

FIG. 5(A) and FIG. 5(B) illustrate the operation of the measuring apparatus shown in FIG. 3.

DETAILED DESCRIPTION OF PREFERRED EMBODIMENTS

Figure 1:
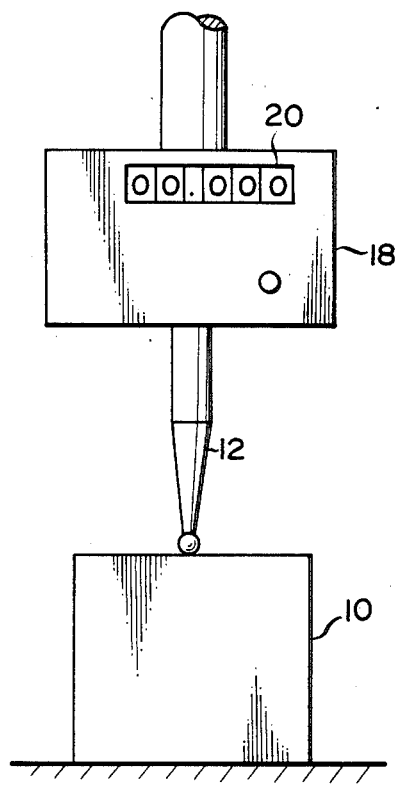
FIG. 1 is a front elevational view of a prior art digital display measuring apparatus.
Figure 2:
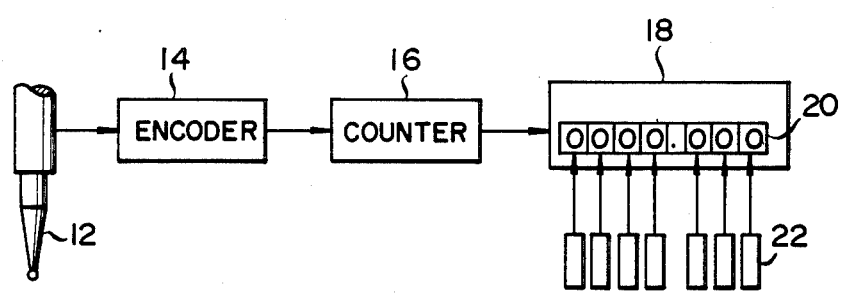
FIG. 2 is a circuit diagram of the prior art digital display measuring apparatus shown in FIG. 1.
Figure 3:
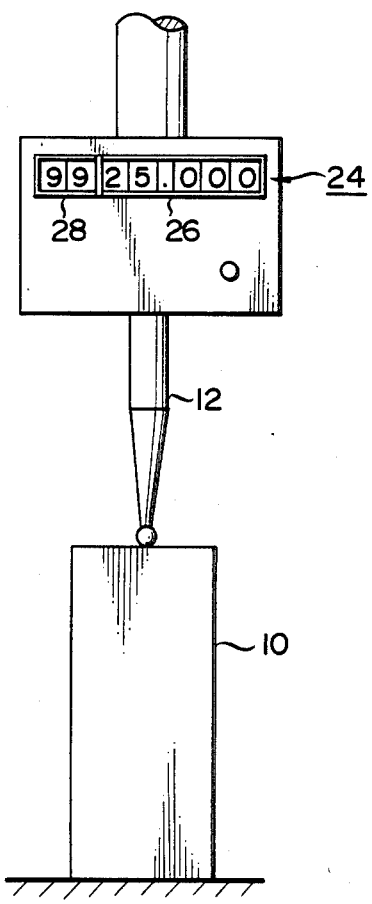
FIG. 3 is a front elevational view of a digital display measuring apparatus constructed according to the present invention.
Figure 4:
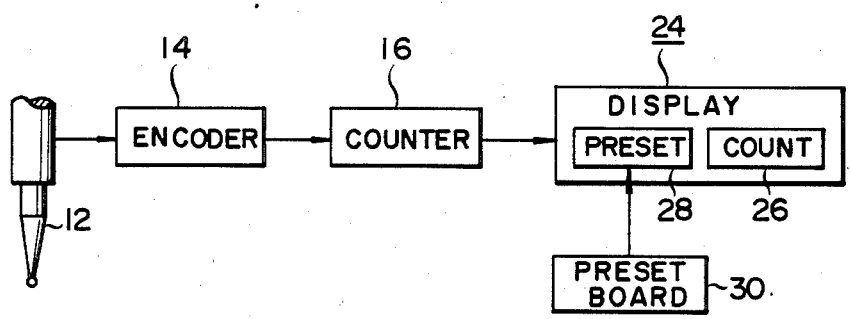
FIG. 4 is a circuit diagram of the measuring apparatus shown in FIG. 3.

A preferred embodiment of the present invention will now be described with reference to FIGS. 3 to 5 in which the same parts as those shown in FIGS. 1 and 2 are designated by the same reference numerals and omitted in description for simplification.

In general, a preset function is not required through the whole figure place when the measurement exceeds the maximum displacement of the contact 12 and if the size of a block gauge can be indicated only by some higher figures. Thus, the size of the block gauge may be preset only with respect to higher indicatable figures. The present invention has been found on the basis of the above technical concept.

A digital display 24 according to the present invention comprises a measurement indicator unit 26 for indicating the displacement of the contact 12, which indicator unit corresponds to the indicator section 20 of the prior art digital display 18, and a preset indicator unit 28 for indicating a preset value of figures higher than those indicated in the measurement indicator unit 26. The preset indicator unit 28 only receives a reference preset value at the input so that a presetting function will be provided sufficiently in practice through a simple structure as described hereinafter.

There is provided a presetting device 30 for supplying a reference preset value to the preset input of the preset indicator unit 28. In the illustrated embodiment, the presetting device 30 includes a memory (not shown) which can store a predetermined reference value near the size of an object to be measured 10. When a preset button (not shown) on the measuring apparatus's casing is actuated, a reference value pre-stored in the memory of the presetting device 30 is presettingly inputted to the preset indicator unit 28. The preset button may be replaced by a touch-sensor which is adapted to actuate immediately when the contact 12 engages the object 10.

Prior to operation, as shown in FIG. 5(A), a block gauge 32 having a size substantially equal to the length of an object to be measured 10 is positioned at a location opposed to the contact 12. Subsequently, the digital display measuring apparatus is vertically moved along the axis of the contact 12 to a position in which the contact 12 is engaged by the block gauge 32. At this time, a reference value corresponding to the length of the block gauge 32, for example, 100 millimeters is stored in the memory of the presetting device 30.

If the preset button is operated, this reference value stored in the memory is supplied to the preset input of the preset indicator unit 28 which in turn indicates digital figures, for example, "01".

The contact 12 is then moved upwardly away from the block gauge 32 which is then removed from under the contact 12. The object to be measured 10 is then positioned at a location opposed to the contact 12. As shown in FIG. 5(B), the contact 12 is moved toward the object 10 and stopped at a point of time when the tip of the contact 12 is engaged by the object 10.

At this time, the measurement indicator unit 26 of the digital display 24 indicates a comparison measurement, that is, a differential value of length between the block gauge 32 and the object 10 being measured, for example, 23.456 millimeters in the illustrated embodiment. By reading the succeeding figures indicated on the preset indicator and measurement indicator units 28 and 26 of the digital display 24, therefore, one can know the absolute measurement of the object 10, that is, 123.456 millimeters.

In the illustrated embodiment, a sufficiently practical preset function can be performed without any processing operation for comparing the reference preset value with an actually measured value. For example, supposing that the maximum displacement of the contact 12 is 25 millimeters and the minimum resolution is 1/1000 millimeters and that the preset indicator unit 28 indicates two figures, oversizes can be measured in the range of ±100.000 millimeters to ±9925.000 millimeters.

Although the present invention has been described as to the preferred embodiment thereof which utilizes the presetting device 30 having its memory for storing a reference value, the reference value may be preset at the preset indicator unit 28 by the use of any other suitable preset input means such as a dial operating means or the like.

It is thus understood from the foregoing statement that the digital display according to the present invention comprises a preset indicator unit for indicating a preset value of figures higher than those indicated in the measurement indicator unit, and a presetting device for supplying a reference value to the preset input of the preset indicator unit. This results in a simplified construction which is sufficiently practical in presetting.

I claim:

1. A digital display measuring apparatus comprising a movable contact on the body of said measuring apparatus and adapted to engage an object to be measured, an encoder for converting the displacement of said contact into an electrical output signal, a counting circuit for counting said electrical output signal from said encoder, and a digital display for digitally indicating the counted value from said counting circuit, said measuring apparatus being characterized in that said digital display includes a measurement indicator display unit for indicating the displacement of said contact, a preset indicator display unit for only indicating a reference preset value of figures higher than those indicated on said measurement indicator display unit simultaneously with the indication of the displacement of the contact on the measurement indicator display unit, and a presetting means for supplying said reference preset value only to said preset indicator display unit, said presetting means comprising a presetting means activation means and a memory means for storing a predetermined reference preset value of figures higher than those indicated on said measurement indicating display unit and for supplying said reference preset value only to said preset indicator display unit when said presetting means activation means is actuated.

2. A digital display measuring apparatus as defined in claim 1, wherein said presetting means activation means comprises a dial for presetting said reference preset value in said memory means and for supplying said reference preset value to the preset input of said preset indicator unit display unit by operating said dial.

3. A digital display measuring apparatus according to claim 1, wherein said presetting means activation means comprises a preset button and said reference preset value which is prestored in said memory means is supplied only to said preset indicator display unit by manual actuation of said preset button.

* * * * *